United States Patent [19]

Rundt et al.

[11] Patent Number: 4,918,310

[45] Date of Patent: Apr. 17, 1990

[54] LIQUID SCINTILLATION COUNTER FOR MEASURING THE ACTIVITY OF RADIOACTIVE SAMPLES CONTAINING A MULTIPLE OF RADIOACTIVE ISOTOPES

[75] Inventors: Kenneth Rundt, Turku; Heikki Kouru, Raisio, both of Finland

[73] Assignee: Wallac OY, Turku, Finland

[21] Appl. No.: 274,488

[22] Filed: Nov. 22, 1988

[30] Foreign Application Priority Data

Dec. 18, 1987 [SE] Sweden ............................ 8705056

[51] Int. Cl.$^4$ .............................................. G01T 1/204
[52] U.S. Cl. .................................... 250/328; 250/362; 250/364
[58] Field of Search .................... 250/362, 364, 328

[56] References Cited

U.S. PATENT DOCUMENTS 3,610,928 10/1971 Thomas .
4,628,205 12/1986 van Cauter et al. ............... 250/364

FOREIGN PATENT DOCUMENTS 1764603 1/1978 Fed. Rep. of Germany .
501932 2/1971 Switzerland .
1145713 3/1969 United Kingdom .

*Primary Examiner*—Carolyn E. Fields
*Attorney, Agent, or Firm*—Fred Philpitt

[57] ABSTRACT

In a liquid scintillation counter the light output from a liquid scintillation sample containing radioactive isotopes of unknown activity is measured by means of a detector. A pulse height analyzer having discriminators that are combined to define pulse height windows, is connected to the detector for measuring and temporarily storing count rates for each of the windows. Moreover, there are means for determining a value for the quench level of the sample. According to the invention the number of pulse height windows is at least $N+1$, when the number of isotopes is N, N being $\geq 2$. There are memory means for storing for each of said windows representations of counting intensities determined by measuring calibration samples of each isotope at different levels of quench. Moreover, there are means for extracting from said stored representations a counting intensity for each window and each isotope on the basis of said determined quench level value, and means for determining for each isotope a factor by which the extracted counting intensities are to be multiplied in order to fit the sum of the extracted counting intensities to the count rates measured for the sample in each window, each said factor being directly related to the amount of each isotope in the sample.

4 Claims, 2 Drawing Sheets

LIQUID SCINTILLATION COUNTER FOR MEASURING THE ACTIVITY OF RADIOACTIVE SAMPLES CONTAINING A MULTIPLE OF RADIOACTIVE ISOTOPES

TECHNICAL FIELD

The invention relates to a liquid scintillation counter comprising a detector for measuring the light output from a liquid scintillation sample containing radioactive isotopes of unknown activity, each isotope producing a characteristic analog spectrum in said detector, a pulse height analyzer, having discriminators that are combined to define pulse height windows, said pulse height analyzer being connected to said detector for measuring and temporarily storing count rates for each of said windows, and means for determining a value for the quench level of said scintillation sample.

BACKGROUND OF THE INVENTION

Liquid scintillation counting is a method for determining the amount of one or more radioactive substances. The method is used mainly for determining beta-emitting isotopes, such as $^3H$, $^{14}C$ and $^{32}P$.

Beta-emitting isotopes decay by emitting energy in the form of a fast electron and a neutrino. The energy liberated in the decay is always constant for a certain radioisotope, but is divided between the electron and the neutrino according to a distribution law. The neutrino can not be detected by using liquid scintillation counting but the electron will through collisional impact transfer some of its energy to the liquid solvent molecules which are then ionized or excited to higher energy levels. Provided that the solvent molecules are mainly of aromatic character and that certain fluorizing compounds are dissolved in the solution, part of the excitation energy deposited by the electron may be transformed to light which can be detected by a photosensitive device such as a photomultiplier. The intensity of the light pulse caused by a decay is proportional to the energy of the electron when ejected from the nucleus. The height of the electrical pulse measured at the output of the photomultiplier device is again proportional to the number of photons in the light pulse. As each decay produces one distinct pulse, with a height proportional to the energy of the beta electron, a certain pulse height distribution, or spectrum, can be recorded. The shape of this pulse distribution not only depends on the decay characteristics but also on the efficiency of the liquid to transform excitation energy into light and the efficiency of the detector to transform photons into detectable electrical pulses. FIG. 1 shows typical pulse height distributions for $^3H$ and $^{14}C$, measured in a liquid scintillation counter having a logarithmic pulse height scale. The number of pulses in the pulse height distribution detected per time unit is called the count rate.

Quenching of the scintillation light pulse means that the number of photons produced in a decay, where the electron has a certain energy, is diminished. Hence, quenching results generally in both lower pulse heights and lower count rates. As the object in most measurements is to determine the activity, which is equal to the disintegration rate, and not only the count rate, the relation between activity and count rate must be known. This relation is equal to the counting efficiency of the sample. As the counting efficiency may vary from sample to sample even within one measurement batch, it becomes necessary to determine the counting efficiency for each sample. All methods in commercial use depend on the determination of some feature describing the movement of the pulse height distribution with the quench level. In these methods, either the pulse height distribution produced by the sample isotope or by an external gamma radiating source ("external standard") may be used. In any case, determination of the efficiency of an unknown sample relies on calibration of the instrument. This step includes the measurement of a number of calibration samples containing known amounts of the pure radioisotopes under study and having different levels of quench. For each radioisotope, one such quench calibration set must include at least two calibration samples. Each quench set thus results in a quench calibration function, giving counting efficiency as a function of some indication of quench level. In the case of two calibration samples for each radioisotope, the quench function will be a straight line. The quench function provides means to interpolate between and to some extent extrapolate from the calibration points.

As one unknown sample may contain two or more different radioisotopes, the counter must have means for distinguishing between the contribution of each radioisotope and determining their activities. One such multilabeled sample may further have a quench level not equal to any of the calibration samples. Since the spectra of the radioisotopes overlap one another more or less (see FIG. 1), a complicated situation arises for which there are a few solutions available in commercial instruments.

A traditional solution, which will be referred to as the "preset window" method, depends on using the same number of preset pulse height windows with fixed limits as there are radioisotopes in the sample. Thus, in the case of a dual-labeled sample, two windows are used. As an example, in FIG. 1 the limits A and B together define a first counting window, while limits B and C define a second counting window. Counts falling between limits A and B are hence referred to as "window 1 counts". Using equal number of windows as there are radioisotopes provides for a simple mathematical relation between the count rate in each window, the efficiency of each radioisotope in each window and the activity of each radioisotope. For instance, if two radioisotopes, Q and P, are present in the sample, then the following equations are valid $$Y_1 = E_{Q1}*A_Q + E_{P1}*A_P$$

$$Y_2 = E_{Q2}*A_Q + E_{P2}*A_P \qquad (1)$$

where $Y_1$ and $Y_2$ are the measured count rates in window 1 and 2, respectively, and $E_{Q1}$, $E_{P1}$, $E_{Q2}$ and $E_{P2}$ are the known counting efficiencies of radioisotopes Q and P in window 1 and window 2, respectively. $A_Q$ and $A_P$ are the unknown activities of the two isotopes. The two equations (1) have two unknowns and can hence be solved by using linear algebra provided that the counting efficiencies $E_{Q1}$, $E_{P1}$, $E_{Q2}$ and $E_{P2}$ are known. These counting efficiencies can be calculated by interpolation between or extrapolation from the calibration sample points, which have to be measured and stored prior to counting unknown samples. This is done in the aforementioned step of calibration. In calibration for multilabeled samples, counting efficiencies and quench level values have to be stored for each radioisotope and each window. Generally, when using preset windows and dual-labeled samples, four quench functions have to be stored in memory.

The main limitation to the preset window method is that the window limits have to be selected so as to suit the quench level of the unknown samples. If the samples have very varying quench levels, the selected windows may be optimal for only some of the samples. Further, the optimal window limits also depend on the relative amounts of the isotopes present, but in general, the relative amounts are not known a priori.

BROAD DESCRIPTION OF THE INVENTION

The object of the invention is to improve the preset window method by removing the aforementioned limitation. This is obtained in that the counter according to the invention is characterized by the number of pulse height windows being at least $N+1$ when the number of isotopes is N, N being $\geq 2$, means for storing for each of said at least $N+1$ windows, representations of counting intensities determined by measuring calibration samples of each of said N isotopes at different levels of quench, means for extracting from said stored representations a counting intensity for each of said at least $N+1$ windows and each of said N isotopes, on the basis of said determined quench level value, and means for determining for each of said N isotopes a factor by which said at least $N+1$ extracted counting intensities are to be multiplied in order to fit the sum of said extracted counting intensities to count rates measured for said sample in each of said at least $N+1$ windows, each said factor being directly related to the amount of each isotope in the sample.

BRIEF DESCRIPTION OF THE FIGURES

The invention will be described more in detail below with reference to the accompanying FIGS. 1, 2, 3 and 4.

DETAILED DESCRIPTION OF THE INVENTION

Figure 1:
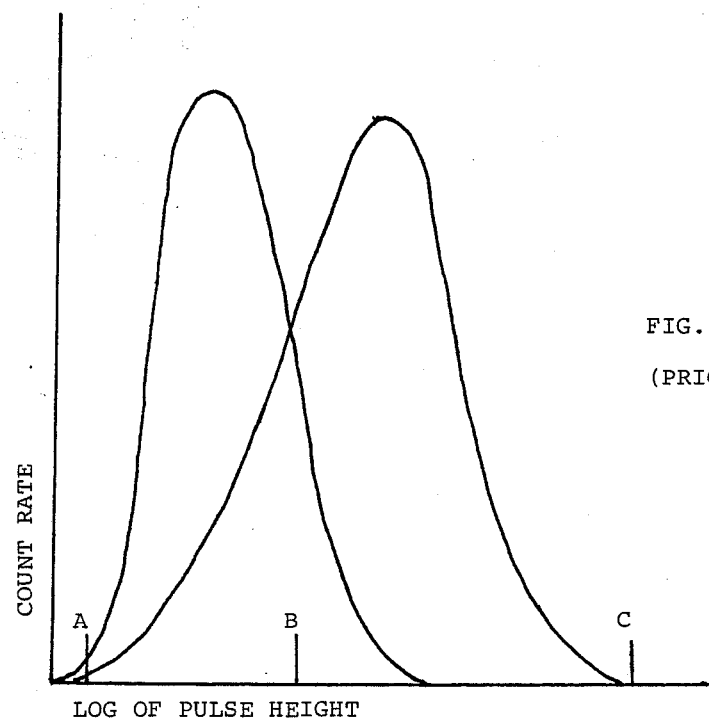
FIG. 1, as indicated above, shows typical pulse height distributions for $^3H$ and $^{14}C$ and suitable limits (A-B and B-C) for two pulse heights windows for measuring a sample containing both of these two isotopes when using the preset window method.
Figure 2:
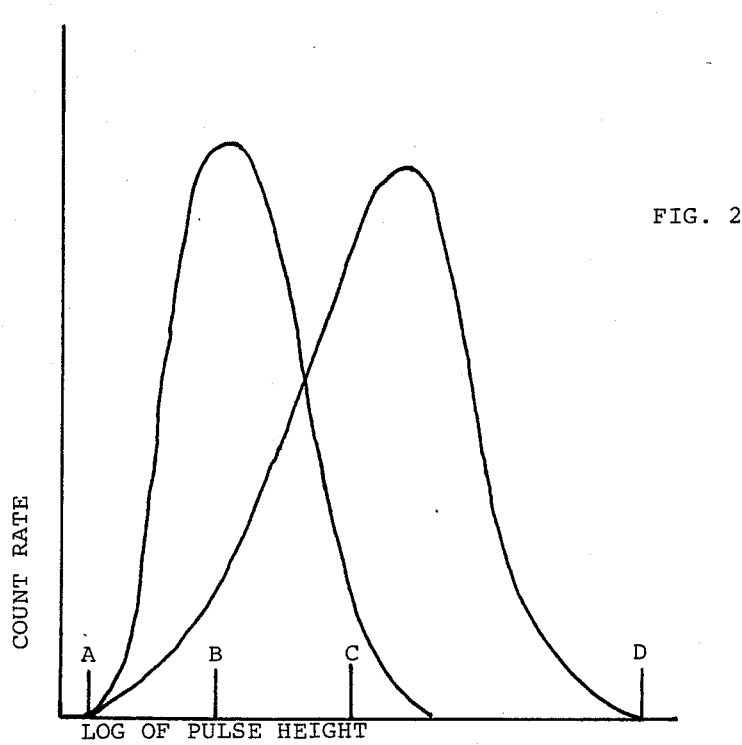
FIG. 2 shows the same distributions and suitable window limits (A-B, B-C and C-D) for an embodiment of the present invention, in which the number of isotopes is equal to two and the number of windows is equal to three.

In the present invention the performance of the fixed window method has been improved by increasing the number of windows to at least $N+1$, when N is equal to the number of radioisotopes in the sample. Practical experiments have shown that, in the case of dual-labeled samples, measuring in three windows, A-B, B-C and C-D, organized as shown in FIG. 2, gives better results than measuring in two windows as shown in FIG. 1. In the case of three windows, numbered 1, 2 and 3, and two radioisotopes, Q and P, the following equations are valid $$Y_1 = R_{Q1}*C_Q + R_{P1}*C_P$$

$$Y_2 = R_{Q2}*C_Q + R_{P2}*C_P$$

$$Y_3 = R_{Q3}*C_Q + R_{P3}*C_P \quad (2a) \text{ or}$$

$$Y_1 = E_{Q1}*A_Q + E_{P1}*A_P$$

$$Y_2 = E_{Q2}*A_Q + E_{P2}*A_P$$

$$Y_3 = E_{Q3}*A_Q + E_{P3}*A_P \quad (2b)$$

In these equations $Y_1$, $Y_2$ and $Y_3$ are the measured count rates for the three windows. In the three equations (2a), $C_Q$ and $C_P$ are the unknown count rates of the two isotopes, $R_{Q1}$, $R_{Q2}$ and $R_{Q3}$ are the relative count rates of radioisotope Q for the three windows, while $R_{P1}$, $R_{P2}$ and $R_{P3}$ are the same for radioisotope P. In the three equations (2b), $A_Q$ and $A_P$ are the unknown activities of the two isotopes, $E_{Q1}$, $E_{Q2}$ and $E_{Q3}$ are the counting efficiencies of radioisotope Q in the three windows, while $E_{P1}$, $E_{P2}$ and $E_{P3}$ are the same for radioisotope P. By relative count rates in this context is meant that the sum of all relative count rates equals a constant value, e.g. 1. Generally, the absolute, measured count rates $Y_i$, the relative count rates $R_i$, and the efficiencies $E_i$ may be referred to as "counting intensities".

As the number of equations (2a) or (2b) exceeds the number of unknowns, these must be solved by using e.g. the standard method of least squares. By way of example only, the use of this method will be shown here for solving eq. (2a). When using matrix notation, this equation can be written in a simple form:

$$Y = R*C$$

wherein Y denotes a column vector comprising the elements $Y_i$ (i=1,2,3), R denotes a matrix comprising the elements $R_{Pi}$ and $R_{Qi}$, and C denotes a column vector comprising the elements $C_P$ and $C_Q$. Furthermore, as the method of weighted least squares will be used here, we must define a weight matrix V wherein all elements except the diagonal ones are equal to zero and the diagonal elements equal to the count rates $Y_i$. In the method of least squares, one tries to find values for the unknowns (in our case $C_P$ and $C_Q$) which minimizes the difference between the values of a measurable parameter (in our case $Y_i$) and the values calculated for that parameter by inserting the computed unknown values into the original equation (in our case eq. (2a)). In this example, this means minimizing the value of S, which is defined as $$S = (*Y - R*C)^T * V^{-1} * (Y - R*C)$$

wherein by T is denoted the transpose of a matrix. The solution to this minimization problem can be written as $$C = (R^T * V^{-1} * R)^{-1} * R^T * V^{-1} * V$$

Writing out the terms in this equation yields the following equations for the unknowns:

$$C_Q = \frac{L - M}{L^2 - M*K} \text{ and } C_p = \frac{L - K}{L^2 - M*K}$$

wherein

-continued $$K = \frac{R_{Q1}^2}{Y_1} + \frac{R_{Q2}^2}{Y_2} + \frac{R_{Q3}^2}{Y_3}$$

$$L = \frac{R_{Q1}*R_{P1}}{Y_1} + \frac{R_{Q2}*R_{P2}}{Y_2} + \frac{R_{Q3}*R_{P3}}{Y_3}$$

$$M = \frac{R_{P1}^2}{Y_1} + \frac{R_{P2}^2}{Y_2} + \frac{R_{P3}^2}{Y_3}$$

The activities can thereafter be calculated by applying the two equations $A_Q=C_Q/E_Q$ and $A_Q=C_Q/E_Q$, where $E_Q$ and $E_P$ are equal to the sum of the counting efficiencies of radioisotopes Q and P, respectively, in all three counting windows taken together.

In more general terms, if the number of radioisotopes is N, the number of windows is W, and W is greater than N, the problem is to find a solution that satisfies a set of W linear equations of the type:

$$Y_i = \sum_k R_{ki}*C_k; \text{ for } i = 1 \ldots W \text{ and } k = 1 \ldots N \quad (3a)$$

or $$Y_i = \sum_k E_{ki}*A_k; \text{ for } i = 1 \ldots W \text{ and } k = 1 \ldots N \quad (3b)$$

where k stands for each of the N radioisotopes and i for each of the W windows. The two sets of linear equations (3a) and (3b) can in most cases be solved for the N unknowns $C_k$ or $A_k$ by applying traditional methods like least squares fit, provided that $Y_i$, which are measured for each sample, and $R_{ki}$ or $E_{ki}$ are known. $R_{ki}$ and $E_{Xi}$ are determined on the basis of the quench level of the sample from the set of calibration values recorded before counting of the unknowns. In general, when solving equations (3a) or (3b), the goal is to find for each radioisotope a factor, equal to either $A_k$ or $C_k$, in such a way that the sum of the calibrated counting intensities multiplied by these factors, deviates from the measured counting intensities of the sample as little as possible.

Figure 3:
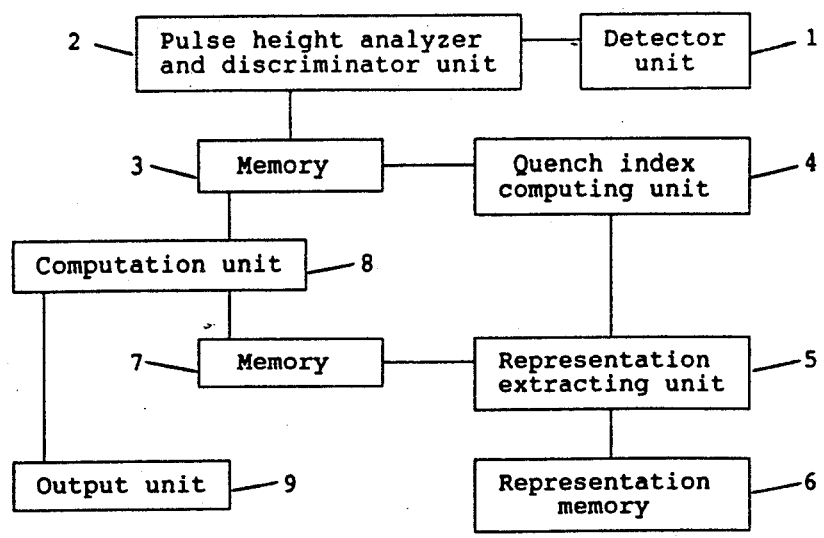
FIG. 3 shows a block diagram of a first embodiment of a liquid scintillation counter according to the invention.

A block diagram of a first embodiment of the liquid scintillation counter according to the invention is shown in FIG. 3. A sample, containing N radioisotopes to be measured, is placed in a detector unit 1, which may comprise two photomultipliers working according to the coincidence principle, with all necessary amplifiers and a coincidence analyzer, or simply a solid state detector with an amplifier. The detector unit 1 also comprises an external standard which can be placed adjacent to the sample when necessary. The analog signal from the detector unit 1 is supplied to a pulse height analyzer and discriminator unit 2, in which the discriminators according to the invention are combined to define at least N+1 windows. The count rates measured in each window are temporarily stored in memory unit 3, which is connected to unit 4, wherein an external standard quench index reflecting the quench level of the sample is computed from the count rates measured with the external standard adjacent to the sample. This quench index value is then supplied to a representation extracting unit 5, which can extract from calibration representations stored in calibration memory unit 6, reference counting intensities for each window and each radioisotope. The extracted counting intensities are temporarily stored in a memory unit 7. The calibration memory 6, which has stored representations of calibration counting intensities at different quench levels, may be any magnetic or optical storing device, like a tape cartridge, a flexible disc, a Winchester-type hard disc, an optical disc, a programmable ROM or a battery backed-up RAM. The memory units 3 and 7 are connected to a computation unit 8, capable of comparing the numerical values in these two memory units and producing for each isotope, a factor by which the counting intensities of the isotope should be multiplied in order for the sum of the counting intensities to fit the measured count rates in memory unit 3. The final multiplication factors, which are proportional to the amount of each radioisotope, are finally supplied to the output unit 9.

Figure 4:
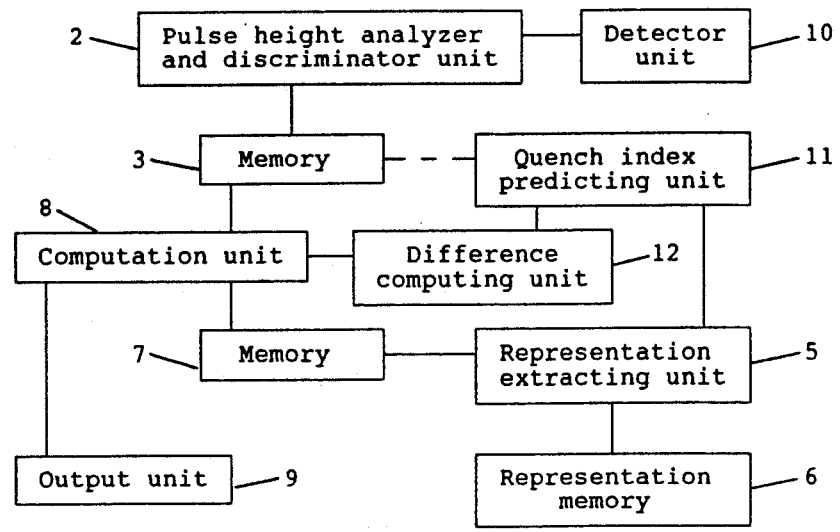
FIG. 4 shows a block diagram of a second embodiment of a liquid scintillation counter according to the invention.

The second embodiment of the liquid scintillation counter according to the invention is shown in FIG. 3. Blocks in FIG. 4, which are identical to blocks in FIG. 3 carry the same reference numerals. Referring to FIG. 4, the sample containing N radioisotopes to be measured, is placed in the detector unit 10, which may comprise two photomultipliers working according to the coincidence principle, with all necessary amplifiers and a coincidence analyzer, or simply a solid state detector with amplifier. The unit may, but need not, comprise an external standard. The analog signal from the detector unit 10 is supplied to a pulse height analyzer and discriminator unit 2, in which the discriminators are combined to define at least N+1 windows. The sample count rates collected in each window are temporarily stored in the memory unit 3. A value for a quench index reflecting the quench level of the sample is predicted by quench index predicting unit 11. The predicted quench index value is then supplied to the representation extracting unit 5, which can extract, from representations stored in the calibration memory 6, reference counting intensities for each window and each radioisotope. The extracted counting intensities are temporarily stored in memory unit 7. The calibration memory 6, which has stored representations of calibration counting intensities at different quench levels, may be any magnetic or optical storing device, like a tape cartridge, a flexible disc, a Winchester-type hard disc, an optical disc, a programmable ROM or a battery backed-up RAM. The memory units 3 and 7 are connected to a computation unit 8, capable of comparing the numerical values in units 3 and 7 and producing for each isotope, a factor by which the counting intensities of the isotope should be multiplied in order for the sum of the counting intensities to fit the measured count rates in unit 3. The computation unit 8 is also connected to a difference computing unit 12, which computes a difference between the measured count rates and the fitted count rates and determines on the basis of this value whether to instruct the quench index predicting unit 11 to produce a new quench value or not. The final multiplication factors, which are proportional to the amount of each radioisotope, are finally supplied to the output unit 9.

If the liquid scintillation counter according to FIG. 4 contains an external standard, this may be used to determine a first predicted quench index value. In this case, the quench index predicting unit 11 must also be connected to the memory unit 3.

Prior to measuring samples having unknown activities, the counter must be quench calibrated. For quench calibration, at least two calibration samples, having different quench levels, are needed for each radioisotope under consideration. Each calibration sample is measured and the count rates in all windows may, before storing in memory, be converted into relative values or efficiencies according to either of the two formulae $$R_i = Y_i/Y_S; \text{ for } i = 1 \ldots W \tag{4a}$$

$$E_i = C_i/A; \text{ for } i = 1 \ldots W \tag{4b}$$

In these equations, Y is the original, absolute count rates in window i, $Y_S$ is equal to the sum of the count rates in all windows and A is the activity of the calibration sample. In the first case, the sum of the relative count rates will be equal to a constant value ($=1$) and in the second case the sum will be equal to the total counting efficiency.

For each calibration sample, the intensity of each window is stored in the calibration memory 6. The counting intensities as a function of quench may also be converted to an analytical function, the parameters of which are stored in memory 6. In general, the counting intensity table or function stored in memory 6 may be referred to as a representation of counting intensities. A value for the quench level, e.g. the external standard quench index, should also be determined and stored in memory 6 for each calibration sample.

The procedure for counting of unknown samples, according to the invention, will be described next. The unknown sample is here supposed to contain at least two radioisotopes, the number being equal to N. The count rates of the sample in each of the at least N+1 windows are measured and stored in the memory unit 3, used only for temporary storage. A value for the quench level of the sample is determined, e.g. by applying the external standard. After counting of the sample, counting intensities for each of the N radioisotopes and the at least N+1 windows are extracted from the representations in memory 6, by using any of the mathematical interpolation methods well known in prior art. This step may involve e.g. inserting stored parameters into an interpolation function, or at first, fitting of an interpolation function, like a cubic SPLINE function, to the counting intensities in memory, and using the interpolation function and the determined sample quench level value, to calculate values for the counting intensities at the sample quench level. If the calibrated count rates stored were absolute values, the interpolated count rates must hereafter be converted to relative values or to counting efficiencies. Finally, the counting intensities are inserted into eq. (3a) (or eq. (3b)) and the unknown count rates (or activities) are calculated.

The main steps of the proposed method are the following:

(a) For each of the N radioisotopes involved, measure a set of calibration samples containing a known amount of the radioisotope in pure form and having different levels of quench. For each calibration sample in the set, record the count rates in W (W>N) windows and store them in a memory together with the determined counting efficiency and a suitable indication of quench level.

(b) For each unknown sample, comprising at least two radioisotopes, record the count rates in the same W windows as above together with a value for the quench level.

(c) For each radioisotope present in the unknown sample, use the quench level value to extract from the calibration data in memory the counting intensities of the W windows.

(d) Fit all counting intensities to the unknown count rates by solving W equations, of the type in (4a) or (4b), e.g. by using the method of least squares, in such a way that the count rate or activity of each radioisotope in the sample is determined.

If an equation similar to (4a) was solved:

(e) For each radioisotope present in the unknown sample, use the quench level value to extract from the efficiencies of the calibration data in memory a value for the efficiency of the sample and compute the activity of the radioisotope by dividing the count rate by the efficiency.

Additionally, the accuracy of the fit may be increased by adjusting the quench level value of the sample and repeating steps (c)–(d) until a satisfying fit have been reached.

We claim:

1. A liquid scintillation counter comprising
   a detector for measuring the light output from a liquid scintillation sample containing radioactive isotopes of unknown activity, each isotope producing a characteristic analog spectrum in said detector,
   a pulse height analyzer, having discriminators that are combined to define pulse height windows, said pulse height analyzer being connected to said detector for measuring and temporarily storing count rates for each of said windows, and
   means for determining a value for the quench level of said scintillation sample characterized by,
   the number of pulse height windows being at least N+1 when the number of isotopes is N, N being $\geq 2$.
   memory means for storing for each of said at least N+1 windows, representations of counting intensities determined by measuring calibration samples of each of said N isotopes at different levels of quench,
   means for extracting from the stored representations a counting intensity for each of said at least N+1 windows and each of said N isotopes, on the basis of the determined quench level value, and
   means for determining for each of said N isotopes a factor by which the at least N+1 extracted counting intensities is to be multiplied in order to fit the sum of the extracted counting intensities to count rates measured for said sample in each of said at least N+1 windows, each said factor being directly related to the amount of each isotope in the sample.

2. A liquid scintillation counter comprising
   a detector for measuring the light output from a liquid scintillation sample containing radioactive isotopes of unknown activity, each isotope producing a characteristic analog spectrum in said detector,
   a pulse height analyzer, having discriminators that are combined to define pulse height windows, said pulse height analyzer being connected to said detector for measuring and temporarily storing count rates for each of said windows,
   characterized by,
   the number of pulse height windows being at least N+1 when the number of isotopes is N, N being $\geq 2$.
   memory means for storing for each of said at least N+1 windows, representations of counting intensities determined by measuring calibration samples of each of said N isotopes at different levels of quench, means for predicting a value for the quench level of said scintillation sample, means for extracting from the stored representations a counting intensity for each of said at least $N+1$ windows and each of said N isotopes, on the basis of the predicted quench level value, means for determining for each of said N isotopes a factor by which the at least $N+1$ extracted counting intensities is to be multiplied in order to fit the sum of the extracted counting intensities to count rates measured for said sample in each of said at least $N+1$ windows, each said factor being directly related to the amount of each isotope in the sample, means for determining the difference between said sum and said measured counting intensities, and means for predicting a new value for the quench level of said scintillation sample, until said difference is minimized.

3. A method in a liquid scintillation counter for determining the amounts of each radioactive isotope in a liquid scintillation sample containing radioactive isotopes, comprising measuring the light output from said sample with a light-sensitive detector, wherein each isotope produces a characteristic analog spectrum, using a pulse height analyzer, having discriminators that are combined to define pulse height windows, to measure and temporarily store count rates for each of said windows, determining a value for the quench level of said scintillation sample, characterized by, measuring in at least $N+1$ windows when the number of isotopes is N, N being $\geq 2$, storing for each of said at least $N+1$ windows, representations of counting intensities determined by measuring calibration samples of each of said N isotopes at different levels of quench, extracting from the stored representations a counting intensity for each of said at least $N+1$ windows, and each of said N isotopes, on the basis of the determined level value, and determining for each of said N isotopes a factor by which the at least $N+1$ extracted counting intensities is to be multiplied in order to fit the sum of the extracted counting intensities to count rates measured for the sample in each of said at least $N+1$ windows, each said factor being directly related to the amount of each isotope in the sample.

4. A method in a liquid scintillation counter for determining the amounts of each radioactive isotope in a liquid scintillation sample containing radioactive isotopes, comprising measuring the light output from said sample with a light-sensitive detector, wherein each isotope produces a characteristic analog spectrum, using a pulse height analyzer, having discriminators that are combined to define pulse height windows, to measure and temporarily store count rates for each of said windows, characterized by, measuring in at least $N+1$ windows when the number of isotopes is N, N being $\geq 2$, predicting a value for the quench level of said scintillation sample, storing for each of said at least $N+1$ windows, representations of counting intensities determined by measuring calibration samples of each of said isotopes at different levels of quench, extracting from the stored representations a counting intensity for each of said at least $N+1$ windows and each of said N isotopes, on the basis of the predicted quench level value, determining for each of said N isotopes a factor by which the at least $N+1$ extracted counting intensities is to be multiplied in order to fit the sum of the extracted counting intensities to count rates measured for said sample in each of said at least $N+1$ windows, each said factor being directly related to the amount of each isotope in the sample, determining the difference between said sum and said measured counting intensities, and predicting a new value for the quench level of said scintillation sample, until said difference is minimized.

* * * * *